(12) United States Patent
Loi et al.

(10) Patent No.: US 8,699,213 B2
(45) Date of Patent: Apr. 15, 2014

(54) ELECTRONIC DEVICE WITH SUPPORTING STANDS

(75) Inventors: Wean-Fong Loi, Taipei (TW); Hung-Hsiang Chen, Taipei (TW); Chia-cheng Shih, Taipei (TW); Alec Wong, Taipei (TW); Hsien-Chih Wu, Taipei (TW); Chiu-Lang Huang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 364 days.

(21) Appl. No.: 12/765,125

(22) Filed: Apr. 22, 2010

(65) Prior Publication Data

US 2011/0103032 A1 May 5, 2011

(30) Foreign Application Priority Data

Nov. 3, 2009 (TW) .............................. 98137175 A (51) Int. Cl.
*G06F 1/16* (2006.01)
*H05K 5/00* (2006.01)
*H05K 7/00* (2006.01)

(52) U.S. Cl.
USPC ................. 361/679.06; 361/679.27; 248/917; 248/923

(58) Field of Classification Search
CPC .... G06F 1/1679; F61M 11/048; F61M 11/06; F61M 11/12; F61M 11/125; F61M 11/126; F61M 13/00
USPC ................. 361/645, 679.06, 679.07, 679.08, 361/679.12, 679.13, 679.27, 679.29, 361/679.44; 248/125.9, 133, 140, 153, 155, 248/155.3, 202.1, 222.51, 251, 394, 395, 248/447, 450, 454, 456, 459, 462, 463, 464, 248/465.1, 466, 469, 472, 473, 476, 477, 248/479, 480, 686, 917, 919, 922, 923, 649, 248/583; 411/24; 108/4, 19, 23; D20/21
See application file for complete search history.

(56) References Cited

U.S. PATENT DOCUMENTS

| 733,860 | A | * | 7/1903 | Mendel | 248/456 |
|---|---|---|---|---|---|
| 6,651,943 | B2 | * | 11/2003 | Cho et al. | 248/919 |
| 7,320,451 | B2 | | 1/2008 | Ogawa | |
| 7,391,606 | B2 | * | 6/2008 | Chen et al. | 248/918 |
| 2005/0001114 | A1 | * | 1/2005 | Ogawa | 248/127 |
| 2005/0121594 | A1 | * | 6/2005 | Kuo | 248/676 |
| 2007/0047186 | A1 | * | 3/2007 | Jang | 361/681 |

* cited by examiner

*Primary Examiner* — Chau N Nguyen
*Assistant Examiner* — Roshn Varghese
(74) *Attorney, Agent, or Firm* — Muncy, Geissler, Olds & Lowe, P.C.

(57) ABSTRACT

An electronic device with supporting stands includes an input/output module, two stands and a limiter. The two stands are obliquely disposed on the back side of the input/output module. The stands are limited by the limiter to move synchronously. At the same time, the limiter has two slots penetrated by the stands to limit moving range for the stands. Then the stands are controlled to swing with an angle and finally the visual angle of the input/output module is varied in suitable range.

11 Claims, 7 Drawing Sheets

ELECTRONIC DEVICE WITH SUPPORTING STANDS

BACKGROUND OF THE INVENTION

1. Field of the Invention

The invention relates to an electronic device and, more particularly, to an electronic device having supporting stands.

2. Description of the Related Art

General electronic devices such as desktop liquid crystal display (LCD) and digital photo frame are usually with a single stand dispose at the back. The stand is for the electronic device to stand firmly on a desktop, and the electronic device can be adjusted for a suitable angle of view or for input commends relatively to the stand. Those stands are usually easy to be folded and to change the positions, rotation angles, and dip angels of these electronic devices to provide a better angle of view or better position for using touch panels.

For instance, the most common stand in a LCD monitor, the single-stand, was pivoted on the back of LCD by a pivot element and the bottom of the single stand was fixed with a supporting plate. The electronic devices can stand on a desktop stably with the supporting plate. The pivot element provides LCD monitor with single-axial rotation for changing the angle of view. However, it is difficult to change the angles by this general design and it is inconvenient to use the supporting plate stand on the desktop.

BRIEF SUMMARY OF THE INVENTION

The electronic device with supporting stands of the present invention includes an input/output module, two stands and a limiter. The two stands are disposed on the back side of the input/output module and each has an embedding portion, a supporting portion and a connecting portion which are connected with each other. The embedding portions are embedded in the back side of the input/output module to swing relative to the input/output module. At the same time, the limiter is penetrated by the connecting portions and has two slots to limit the moving range for the connecting portions. The swing ranges of the stands are controlled, and then the stands sustain firmly on a surface by supporting portions.

The movements of the stands are limited by the limiter pivoted on the input/output module. Therefore, when the stands are swung, the stands and the limiters are moved synchronously. That is to say, when the two stands swing within the same range, the angles of the input/output module are changed relatively to the stands. Then, it varies the visual angle of the input/output module by the supporting portions on a surface. The present invention varies the visual angle of the input/output module by stands to provide users a well-used way of adjusting angle. It is also easy to be gathered and more convenient for users.

These and other features, aspects and advantages of the present invention will become better understood with regard to the following description, appended claims, and accompanying drawings.

DETAILED DESCRIPTION OF THE EMBODIMENTS

Figure 1:
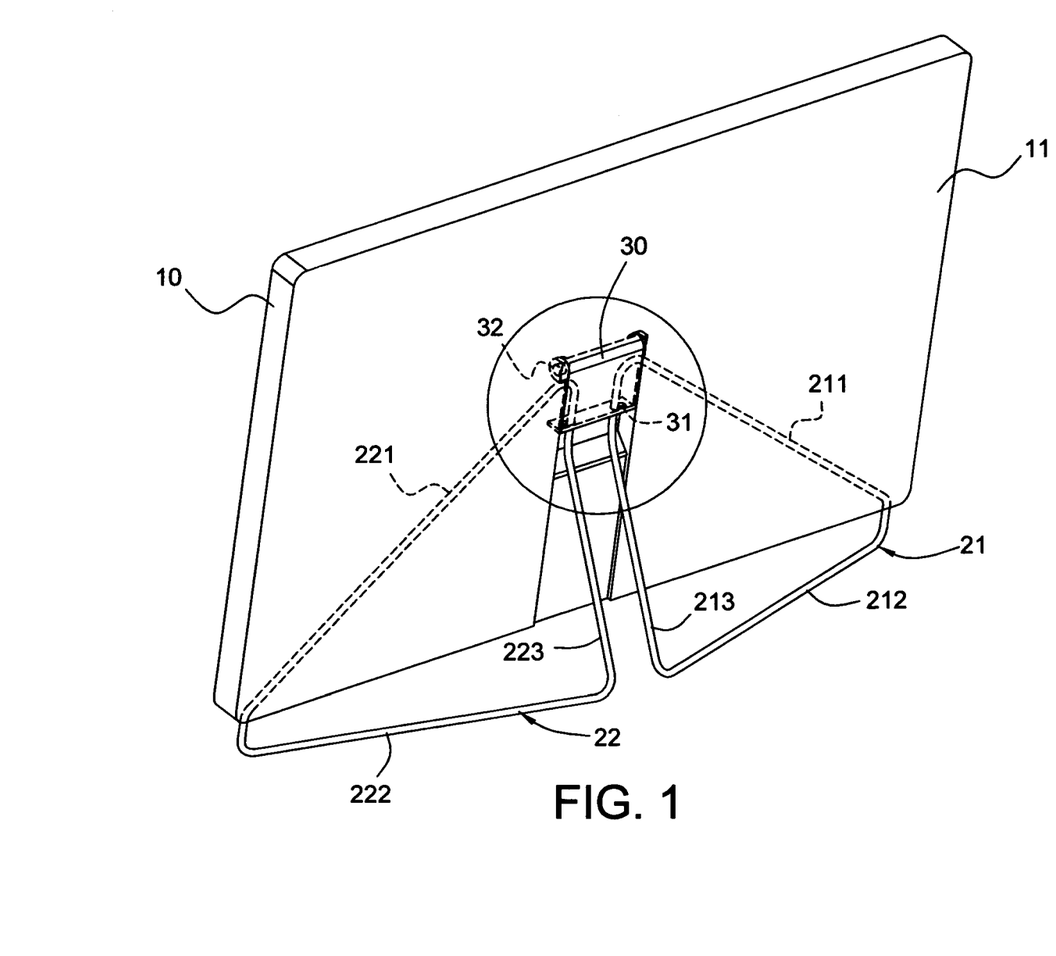
FIG. 1 is a schematic diagram of an electronic device with supporting stands of the present invention.

FIG. 1 is a schematic diagram of an electronic device with supporting stands of the present invention.

The electronic device with supporting stands of the present invention includes an input/output module 10, two stands 21, 22 and a limiter 30. The input/output module 10 may be any electronic device that can output images/voices/signals or receive input signals, such as a liquid crystal display (LCD) of a desktop, a digital photo frame, a tablet PC with touch panel and the like. The two stands 21, 22 are composed of a bent rod and each has an embedding portion 211, 221, a supporting portion 212, 222 and a connecting portion 213, 223 which are connected with each other. Moreover, the rod can be bended to any shapes for the electronic device to sustain firmly on a surface, for example, a triangle, a rectangle, or any multi-angle shapes.

The embedding portions 211, 221 are symmetrically and obliquely embedded in the back side 11 of the input/output module 10. The supporting portions 212, 222 and the connecting portion 213, 223 of the stands 21, 22 are exposed from the input/output module 10. A user can swing the supporting portions 212, 222 and the connecting portion 213, 223 by the embedding portions 211, 221 to rotate the stands 21, 22 relatively to the input/output module 10. In a preferred embodiment, the stands 21, 22 are symmetrically disposed at the back side 11 of the input/output module 10.

Figure 7:
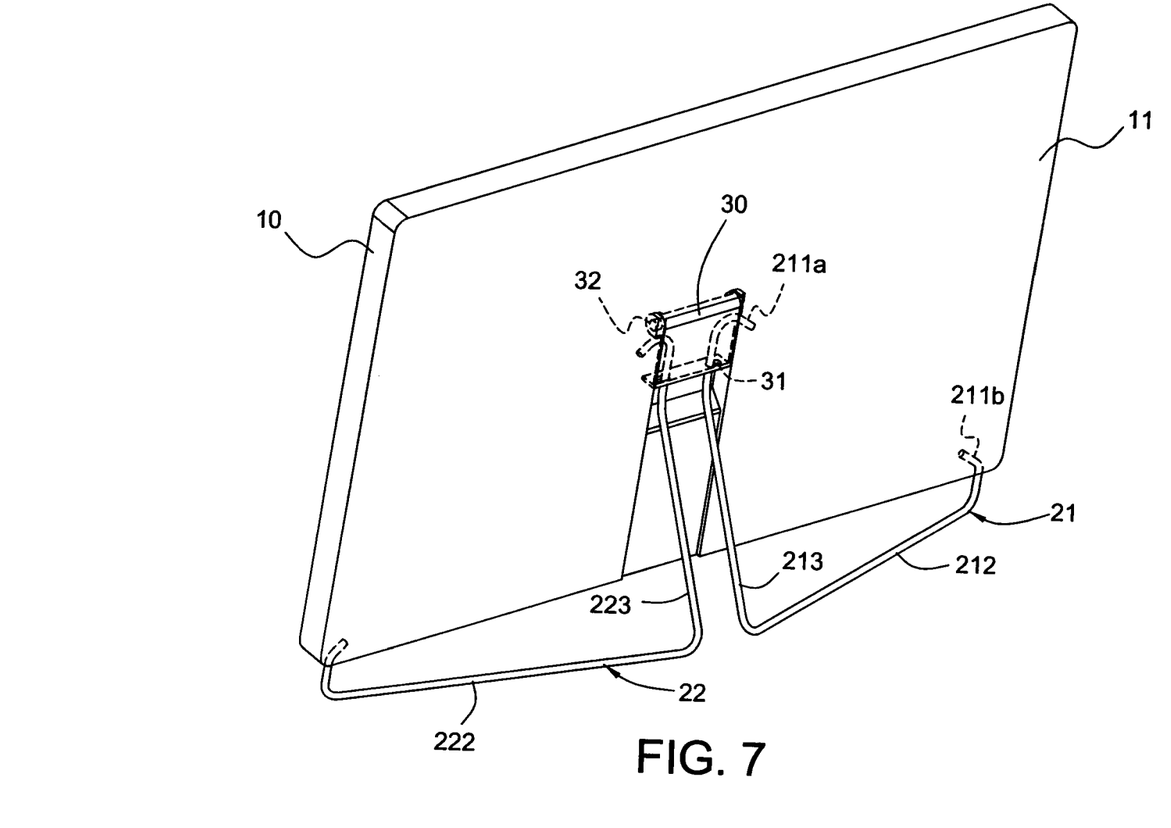
FIG. 7 is a schematic diagram of an electronic device with supporting stands of the present invention showing the embedding portions partially eliminated from the stands.

Besides, since the embedding portions 211, 221 are broadly arranged at the back side 11 of the input/output module 10, and taken as the swinging axis of the stands 21, 22, the embedding portions 211, 221 can provide high torque resistance to maintain useful life. However, as shown in FIG. 7, the embedding portions 211, 221 can be partially eliminated from the stands for cost down, only two ends of the embedding portions 211a, 211b remained and hook the back side 11 of the input/output module 10 for securely disposed. Of course, two ends of the embedding portions 211a, 211b are obliquely disposed in the back side 11 of the input/output module 10 for a supreme exterior appearance.

Figure 3:
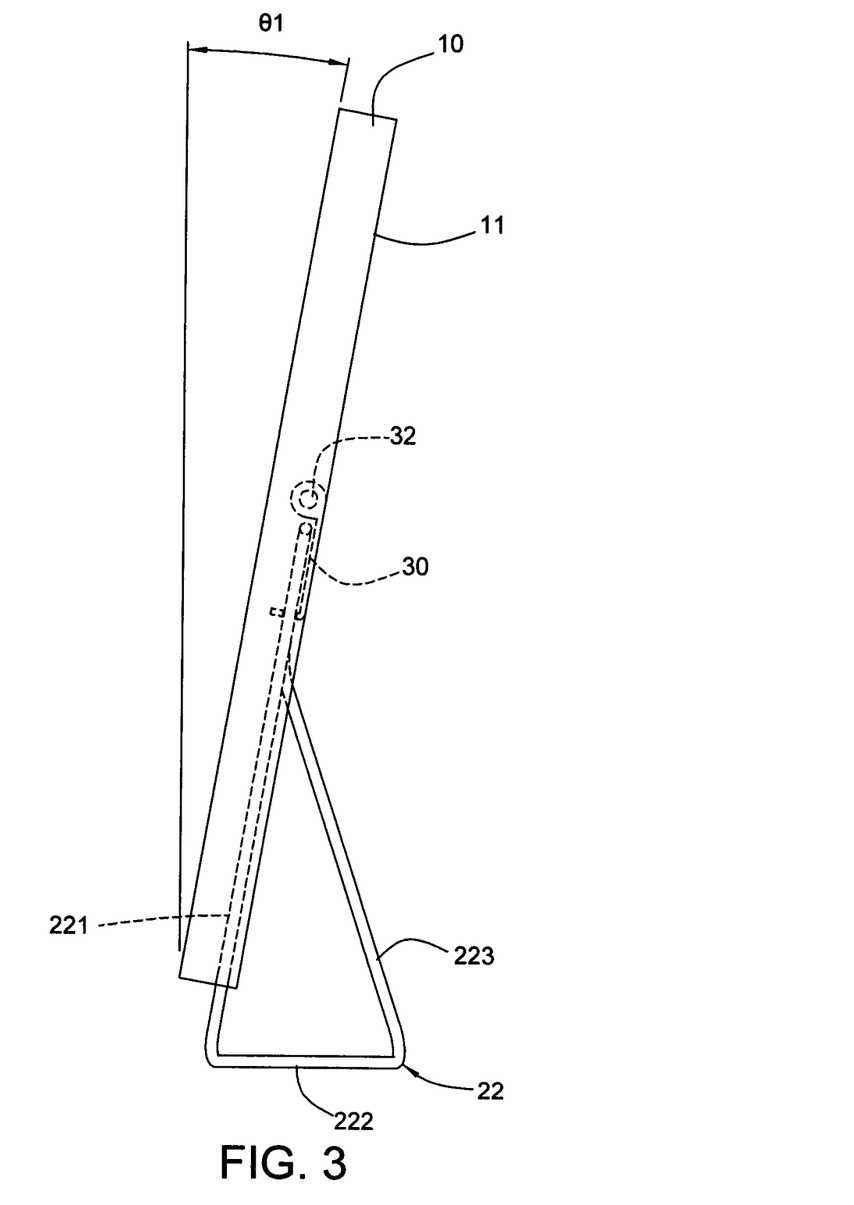
FIG. 3 is a schematic diagram of an electronic device with supporting stands of the present invention showing visual angle in an embodiment.

As shown in FIG. 3, the electronic device are supported on a surface with a first oblique angle θ 1 by the bottom of the input/output module 10 and the supporting portions 212, 222 of the stands 21, 22. Furthermore, because the stands 21, 22 are obliquely disposed in the back side 11 of the input/output module 10, and the bottom of the input/output module 10 and the supporting portions 212, 222 of the stands 21, 22 have a firm supporting surface, the stands 21, 22 have to be controlled to move synchronously to decrease the complication of the apparatus.

Figure 2:
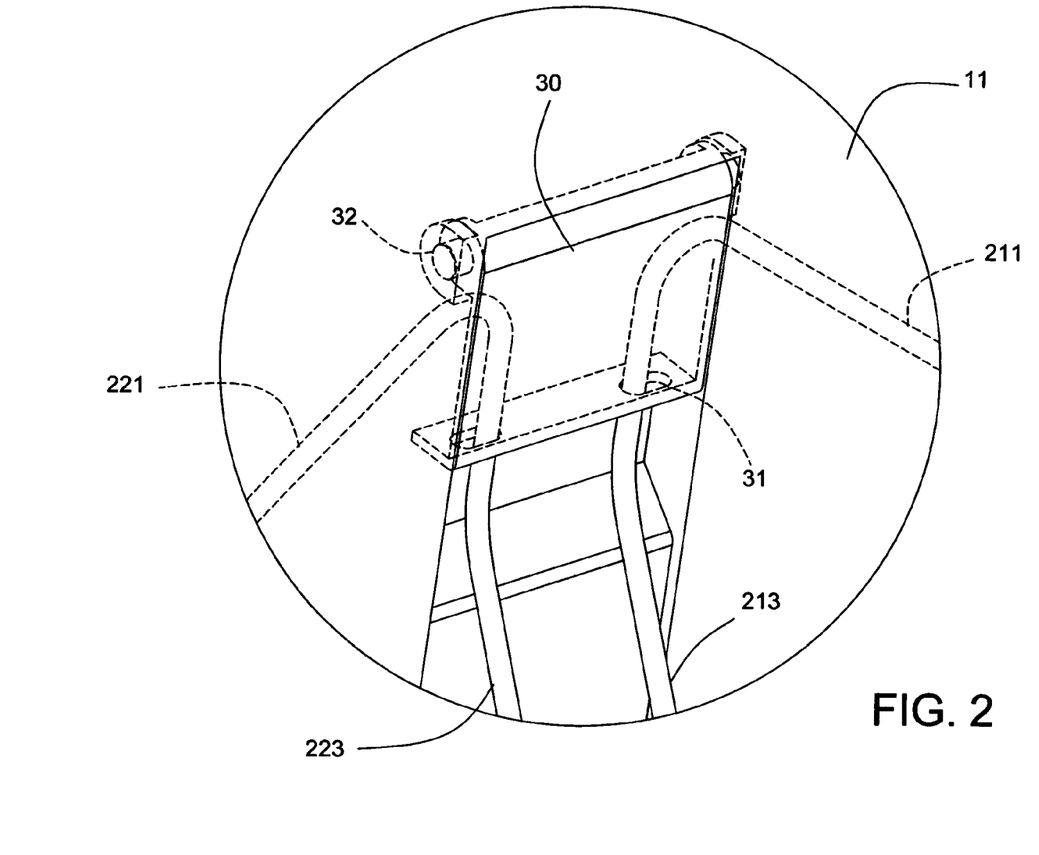
FIG. 2 is a schematic diagram of an electronic device with supporting stands of the present invention showing stands penetrate through the limiter.

As shown in FIG. 2, the limiter 30 is also pivoted on the back side 11 of the input/output module 10. The limiter 30 also includes two through holes 31 to be penetrated by the connecting portions 213, 223 of the stands 21, 22.

In a preferred embodiment, the through holes 31 are slots to provide a moving range for the connecting portions 213,223. As a result, taking the stand 21 as an example, when a user swings the stand 21 out by the connecting portion 213, the stand 21 is swung about the embedding portion 211 as the axis. Because the connecting portion 213 penetrates through the limiter 30, the limiter 30 is driven by the connecting portion 213. The limiter 30 takes the pivot 32 thereof as the rotation axis relative to the input/output module 10. The pivot 32 is located at an elevation above the two through holes 31. In the meantime, the connecting portions 213, 223 of the stands 21, 22 also penetrate through the two through holes 31 and couple operably to the pivot 32 in such a manner to permit synchronous movement of the stands 21, 22 relative to the input/output module 10. Under this condition, when the pivot 32 rotates around its axis from being driven by the stand 21, the connecting portion 223 penetrated through the limiter 30 simultaneously moves to synchronously swing the other stand 22.

Moreover, the supporting portions 212, 222 include a slip-proof member respectively. The slip-proof members provide stronger frictional force to make the supporting portions 212, 222 firmly stand on a surface.

Figure 4:
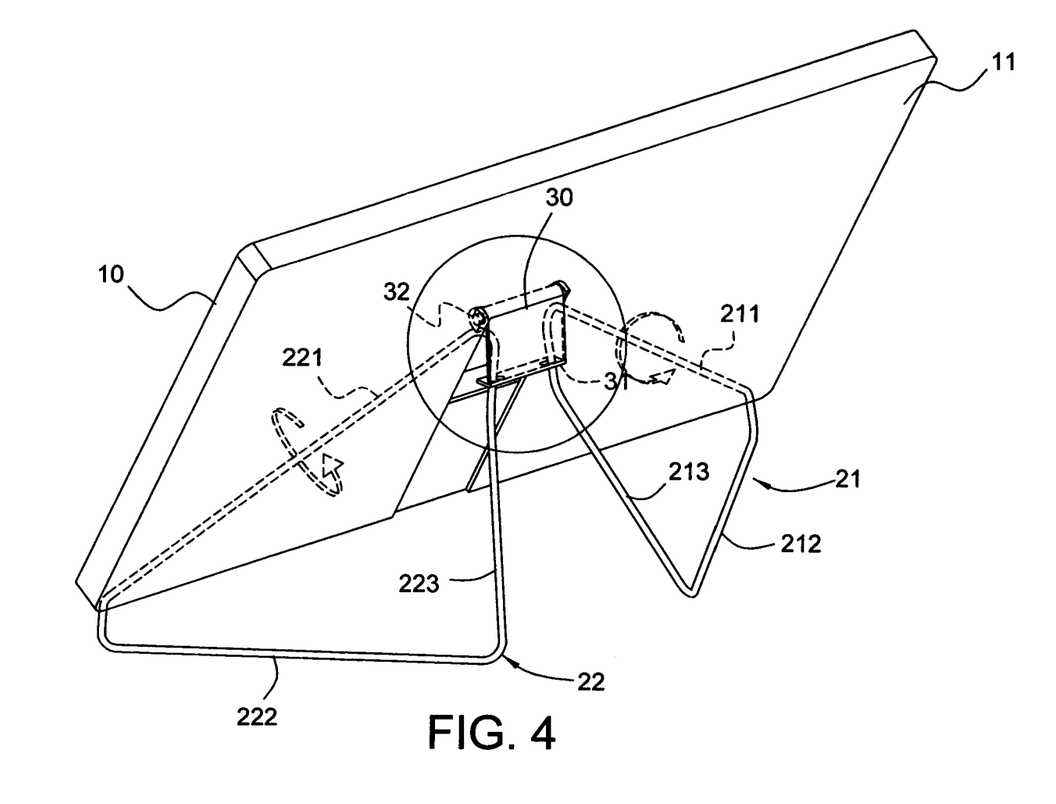
FIG. 4 is a schematic diagram of an electronic device with supporting stands of the present invention to show the stands swing.
Figure 5:
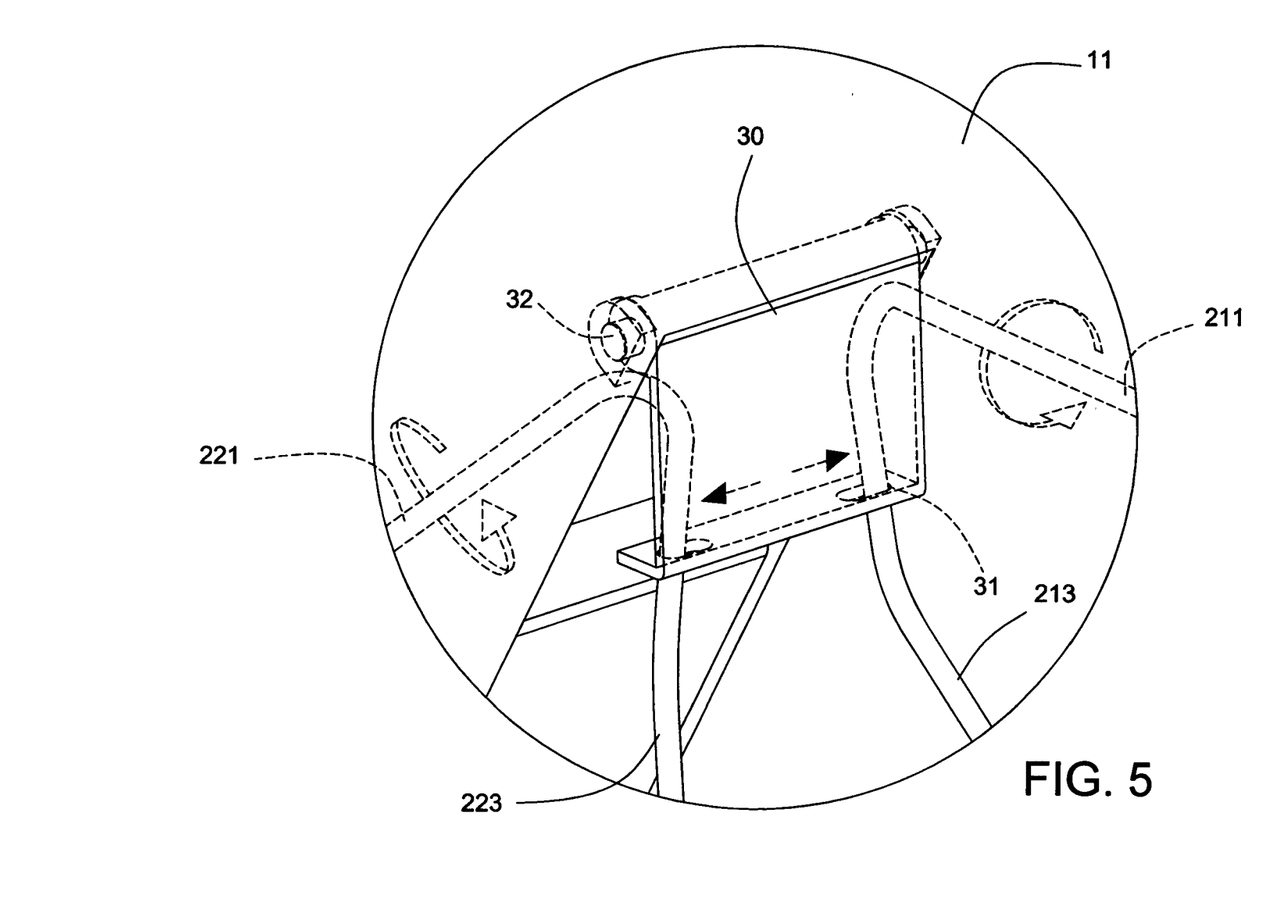
FIG. 5 is a schematic diagram of an electronic device with supporting stands of the present invention showing the relative position of the stands and the limiter during swinging of FIG. 4.

FIGS. 4 and 5 are schematic diagrams showing the stands swinging according to the present invention.

When a user would like to change the visual angle of the electronic device, i.e. the oblique angle of the input/output module 10, the supporting portions 212, 222 and the connecting portions 213,223 of the stands 21, 22 can be swung relatively to the input/output module 10. As shown in FIGS. 4 and 5, the supporting portions 212, 222 and the connecting portions 213,223 of the stands 21, 22 move away from the back side 11 of the input/output module 10, and swing about the embedding portions 211, 221 of the stands 21, 22.

Both of the connecting portions 213,223 of the stands 21, 22 penetrate through the through holes 31 of the limiter 30. The limiter 30 is pivoted on the input/output module 10 by the pivot 32 thereof. Therefore, the structure provides single rotary degree of freedom. When the stands 21, 22 swing to drive the limiter 30, the limiter 30 only can rotate in the rotary degree of freedom. Besides, the stands 21, 22 swing about the embedding portions 211, 221. As a result, the stands 21, 22 and the limiter 30 form a constraint structure. In other words, when the position of the stands 21 is fixed, the limiter 30 and the other stands 22 only has one corresponding position without displacing.

The stands 21, 22 are controlled by the limiter 30, so they synchronously move, and the range of swing is the same. Therefore, only one of the stands 21, 22 swings, the other stands 21, 22 synchronously swings accordingly. As shown in FIGS. 2 and 5, the stands 21, 22 swing out to drive the limiter 30 to move away from the back side 11 of the input/output module 10. Because the connecting portions 213, 223 of the stands 21, 22 are disposed in the through holes 31, connecting portions 213, 223 also move from inside to outside.

Figure 6:
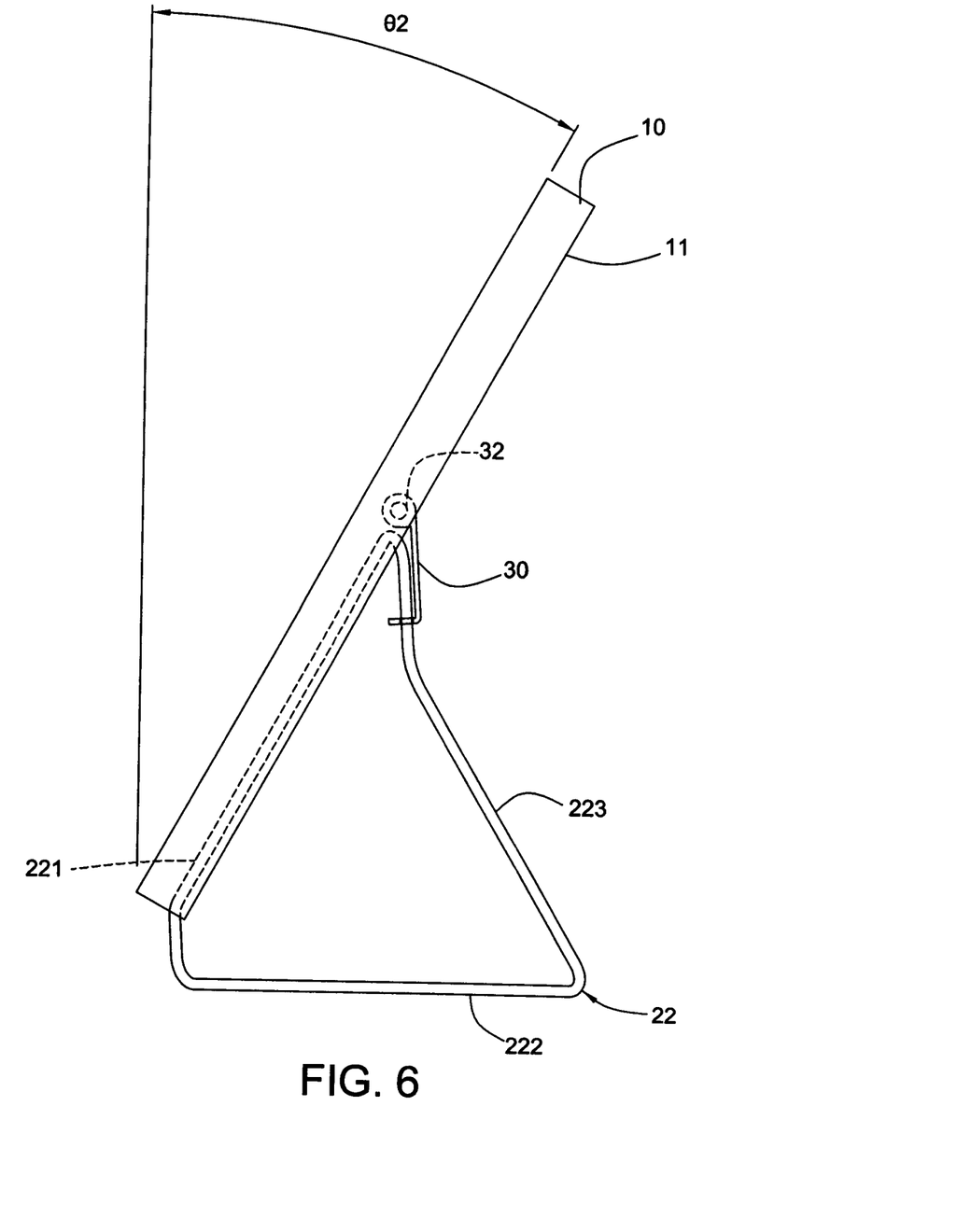
FIG. 6 is a schematic diagram of an electronic device with supporting stands of the present invention showing visual angle in another embodiment.

As shown in FIG. 6, after the stands 21, 22 swing out, the supporting portions 212, 222 of the stands 21, 22 and bottom of the input/output module 10 form a larger triangle area to change the oblique angle of the input/output module 10 to a second oblique angle θ2. In other words, the visual angle of the electronic device is adjusted.

Excepting the two visual angles showing in FIGS. 3, 6 respectively, the stands 21, 22 also can be located in any position in the range of the through holes 31 of the limiter 30 to provide various visual angles. For example, the embedding portions 211, 221 of the stands 21, 22 and the input/output module 10 may tightly fit with each other to form a stepless adjustment. Besides, protrusions may be disposed on the through holes 31 of the limiter 30 and the pivot 32 of the limiter 30 may include positioning mechanism. Meanwhile, the shape of the stands 21, 22 or the length of the through holes 31 may also be modified to provide different range of the visual angle.

Therefore, according to the electronic device with supporting stands of the present invention, a pair of stands disposed symmetrically and obliquely operates the limiter to control the stands to move synchronously. The foregoing can provide users a well-used oblique angle adjust apparatus to get more convenience for users.

Although the present invention has been described in considerable detail with reference to certain preferred embodiments thereof, the disclosure is not for limiting the scope of the invention. Persons having ordinary skill in the art may make various modifications and changes without departing from the scope of the invention. Therefore, the scope of the appended claims should not be limited to the description of the preferred embodiments described above.

What is claimed is:

1. An electronic device comprising:
   an input/output module;
   a limiter disposed at a back side of the input/output module and formed with two through holes, the limiter further including a pivot located at an elevation above the through holes; and
   two stands, each stand having an embedding portion pivoted on the back side of the input/output module, a supporting portion and a connecting portion which are connected with each other and which are exposed from the input/output module;
   wherein, the connecting portions of the two stands penetrate through the two through holes and couple operably to the pivot in such a manner that rotation of the pivot on its axis and when one stand rotates around its embedding portion on the back side of the input/output module, the other stand synchronously and symmetrically rotates around its embedding portion on the back side of the input/output module, thereby the stands are permitted to synchronously and symmetrically move toward and away from the back side of the input/output module.

2. The electronic device according to claim 1, wherein the two embedding portions are symmetrically disposed in the back side of the input/output module.

3. The electronic device according to claim 1, wherein the two embedding portions are obliquely disposed in relation to the top and sides of the input/output module in the back side of the input/output module.

4. The electronic device according to claim 1, wherein the two stands adjust an angle relative to the input/output module via the two embedding portions to change an oblique angle of the input/output module supported by the two supporting portions.

5. The electronic device according to claim 1, wherein the two connecting portions penetrate through the limiter.

6. The electronic device according to claim 1, wherein the two through holes are two slots to limit moving range for the two connecting portions.

7. The electronic device according to claim 1, wherein the two supporting portions comprise a slip-proof member respectively.

8. The electronic device according to claim 1, wherein the embedding portion of each stand is obliquely disposed in relation to the embedding portion of the other stand.

9. The electronic device of claim 1, wherein the two stands are not directly connected.

10. The electronic device of claim 1, wherein an axis of rotation of the pivot differs from an axis of rotation of each embedded portion.

11. The electronic device of claim 1, wherein the embedded portion of each stand is directly connected to the supporting portion and the connecting portion.

* * * * *